(12) United States Patent
Feng et al.

(10) Patent No.: US 8,446,696 B2
(45) Date of Patent: May 21, 2013

(54) SUSPENSION HAVING A SHORT FLEXURE TAIL, HEAD GIMBAL ASSEMBLY AND DISK DRIVE UNIT WITH THE SAME

(75) Inventors: Xianwen Feng, DongGuan (CN); Jugang Zhang, DongGuan (CN); Tan Tian, DongGuan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 866 days.

(21) Appl. No.: 12/588,551

(22) Filed: Oct. 19, 2009

(65) Prior Publication Data

US 2011/0090599 A1    Apr. 21, 2011

(51) Int. Cl.
*G11B 5/55* (2006.01)
*G11B 21/08* (2006.01)

(52) U.S. Cl.
USPC ......................................................... 360/264.2

(58) Field of Classification Search
USPC ..................................................... 360/264.2
See application file for complete search history.

(56) References Cited

U.S. PATENT DOCUMENTS

| 5,555,619 | A * | 9/1996 | Maggio et al. | 29/860 |
| 7,538,981 | B1 * | 5/2009 | Pan | 360/264.2 |
| 7,583,475 | B2 * | 9/2009 | Matsumoto et al. | 360/245.9 |
| 7,724,478 | B2 * | 5/2010 | Deguchi et al. | 360/245.9 |
| 7,907,369 | B1 * | 3/2011 | Pan | 360/264.2 |
| 8,068,314 | B1 * | 11/2011 | Pan et al. | 360/264.2 |
| 8,194,355 | B1 * | 6/2012 | Pan et al. | 360/264.2 |
| 2003/0053257 | A1 * | 3/2003 | Wada et al. | 360/245.9 |

* cited by examiner

*Primary Examiner* — Julie Anne Watko
(74) *Attorney, Agent, or Firm* — Nixon & Vanderhye PC

(57) ABSTRACT

A suspension for a head gimbal assembly comprises a flexure having a flexure having a tail with a plurality of electrical traces and a plurality of bonding terminals adapted for connecting with a flexible printed circuit formed thereon. Each of the bonding terminals comprises a connecting pad and a hole formed at one end of the connecting pad for electrically and mechanically connecting the connecting pad to the flexible printed circuit by bonding material. And the connecting pad has a bonding portion adjacent to the hole and an exposed portion for testing. The invention also discloses a head gimbal assembly and a disk drive unit with the same.

15 Claims, 5 Drawing Sheets

SUSPENSION HAVING A SHORT FLEXURE TAIL, HEAD GIMBAL ASSEMBLY AND DISK DRIVE UNIT WITH THE SAME

FIELD OF THE INVENTION

The present invention relates to information recording disk drive devices and, more particularly, to a suspension having a flexure having a short flexure tail, head gimbal assembly (HGA) and disk drive unit with the same.

BACKGROUND OF THE INVENTION

Hard disk drives are common information storage devices. Referring to FIG. 1A, a conventional disk drive 100 typically includes a series of rotatable disks 111, a motor spindle 112 for spinning the disks 111, an Head Stack Assembly (HSA) 116 which is rotatable about an actuator arm axis 113 for accessing data tracks on disks during seeking, and a printed circuit board assembly (FPC) 117 connected with the HSA 116. The HSA 116 includes at least one drive arm 114 and one HGA 115.

Referring to FIG. 1B, the HGA 115 includes a slider 121 having a reading/writing transducer imbedded therein, and a suspension 190 to load or suspend the slider 121 thereon. As illustrated, the suspension 190 includes a load beam 123, a base plate 125, a hinge 124 and a flexure 122, all of which are assembled together.

FIG. 1C shows a more detailed structure of a tail of the flexure 122. As illustrated in the figure, a plurality of electrical traces 131 along a length direction of the flexure 122, a plurality of bonding terminals 150 and a plurality of testing pads 135 are formed on the flexure 122. One end of the electrical traces 131 passes through the bonding terminals 150 and the testing pads 135 and electrically connects to a preamplifier (not shown), the other end thereof extends into the suspension tongue (not shown). Concretely, each of the bonding terminals 150 has a bonding pad 132 and a hole 133 formed in the bonding pad 132. And the hole 133 is shaped as a key. Referring to FIGS. 1B-1C, when bonding the bonding terminals 150 to the FPC 117 with solder, the solder will flow out from the holes 133 when heating. So the flexure 122 is bonded to the FPC 117.

Because of the shape of the holes 133, there is not enough area to place dynamic performance testing pads 135 for dynamic performance testing. So an additional area 134 is added on the tail of the flexure 122 for placing the dynamic performance testing pads 135. And the additional area 134 with the dynamic performance testing pads 135 will be moved after the dynamic performance testing. Due to the additional area 134, the length of the flexure 122 is increased and, in turn, the cost of the suspension will also be increased in mass production.

Thus, there is a need for an improved suspension, HGA and disk drive unit that do not suffer from the above-mentioned drawbacks.

SUMMARY OF THE INVENTION

One aspect of the present invention is to provide a suspension having a short flexure tail to bond and test on the different part of the same portion, thus shortening the suspension length and further reducing the cost of the suspension in the mass production.

Another aspect of the present invention is to provide a HGA having a short flexure tail to bond and test on the different part of the same portion, thus shortening the suspension length and further reducing the cost in the mass production.

Yet another aspect of the present invention is to provide a disk drive unit with having a short flexure tail to bond and test on the different part of the same portion, thus shortening the suspension length and further reducing the cost in the mass production.

To achieve above objectives, a suspension for a HGA comprises a flexure having a tail with a plurality of electrical traces and a plurality of bonding terminals adapted for connecting with a FPC formed thereon. Each of the bonding terminals comprises a connecting pad and a hole formed at one end of the connecting pad for electrically and mechanically connecting the connecting pad to the FPC by bonding material. And the connecting pad has a bonding portion adjacent to the hole and an exposed portion for testing.

As another embodiment of the present invention, the hole comprises a center hole and two through slots connected with the center hole, and the connecting pad has a bonding portion positioned between the two through slots and an exposed portion for testing. Preferably, the connecting pad is copper pad.

As still another embodiment of the present invention, the flexure comprises a stainless steel layer and two insulate layers, one of the two insulate layers forms between the stainless steel layer and the other insulate layer, the other insulate layer has electrical traces formed therein. Preferably, the insulate layer is made of polyimide.

As yet another embodiment of the present invention, the flexure further comprises cover layers formed on the surface of the flexure.

A HGA comprises a slider and a suspension with a flexure for supporting the slider. The suspension comprises a flexure having a tail with a plurality of electrical traces and a plurality of bonding terminals adapted for connecting with a FPC formed thereon. Each of the bonding terminals comprises a connecting pad and a hole formed at one end of the connecting pad for electrically and mechanically connecting the connecting pad to the FPC by bonding material. And the connecting pad has a bonding portion adjacent to the hole and an exposed portion for testing.

A disk drive unit comprises a HGA including a slider and a suspension that supports the slider, a series of rotatable disks mounted on a spindle motor, a FPC connected to the HGA and an arm connected to the HGA. The suspension comprises a flexure having a tail with a plurality of electrical traces and a plurality of bonding terminals adapted for connecting with a FPC formed thereon. Each of the bonding terminals comprises a connecting pad and a hole formed at one end of the connecting pad for electrically and mechanically connecting the connecting pad to the FPC by bonding material. And the connecting pad has a bonding portion adjacent to the hole and an exposed portion for testing.

In comparison with the prior art, as the connecting pad has a bonding portion adjacent to the hole for bonding with the FPC and an exposed portion for testing, the bonding terminals can be adapted both for dynamic performance testing and for bonding, the additional area with the dynamic performance testing pads formed thereon can be omitted and, in turn, the suspension length can be shortened, thus reducing the cost of suspension in the mass production.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1A:
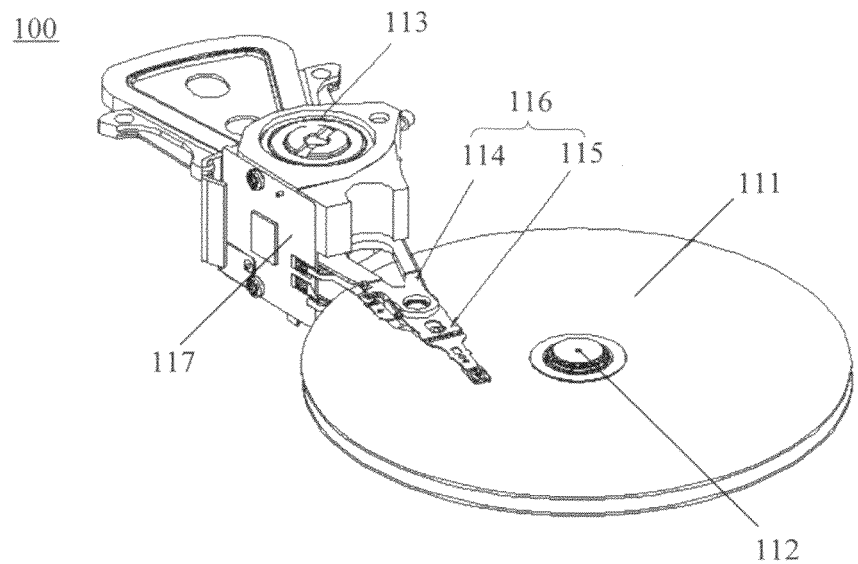
FIG. 1A is a perspective view of a conventional disk drive unit.
Figure 1B:
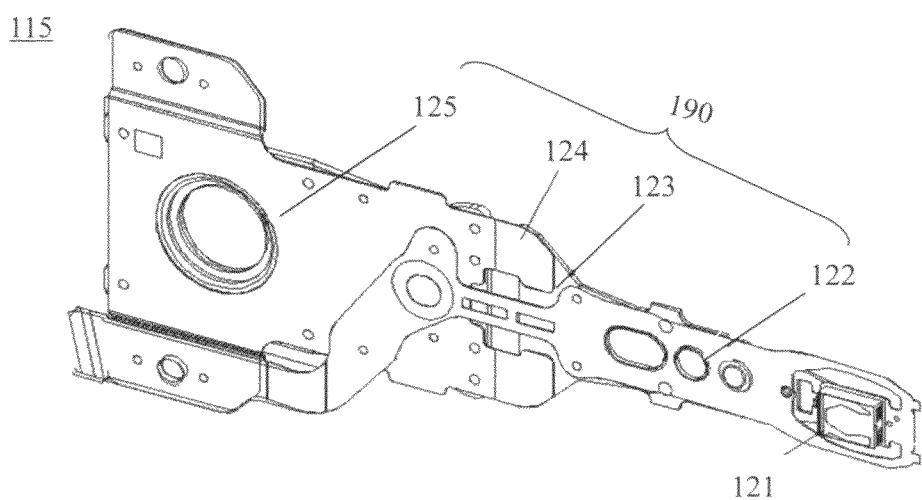
FIG. 1B is a perspective view of a conventional HGA.
Figure 1C:
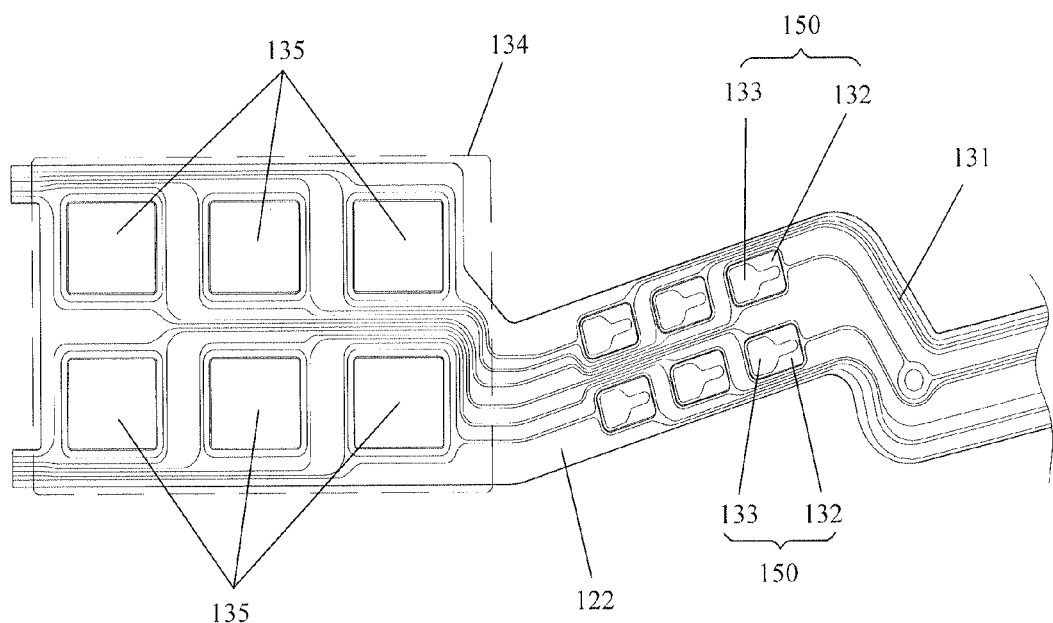
FIG. 1C is a partial top plan view of a flexure of the HGA shown in FIG. 1B.

Various preferred embodiments of the invention will now be described with reference to the figures, wherein like reference numerals designate similar parts throughout the various views. As indicated above, the invention is directed to a suspension for a HGA of a disk drive unit, which includes a flexure having a tail with bonding terminals formed thereon, and each of the bonding terminal has a connecting pad which can be adapted both for dynamic performance testing and for bonding and a hole formed at one end of the connecting pad. By providing a new design on the bonding terminals, the dynamic performance testing can be made on the bonding terminals, thus shortening the suspension length and further reducing the cost of the suspension in the mass production.

Figure 2:
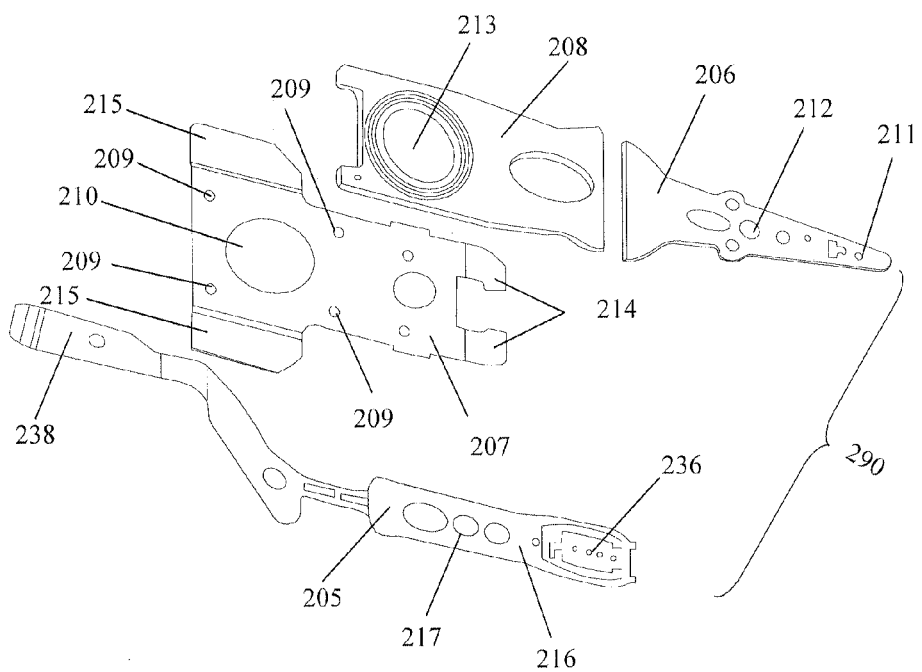
FIG. 2 is an exploded perspective view of a suspension according to an embodiment of the present invention.

FIG. 2 shows an embodiment of a suspension of the present invention. As illustrated in FIG. 2, a suspension 290 including a load beam 206, a base plate 208, a hinge 207 and a flexure 205, all of which are assembled with each other.

Figure 6:
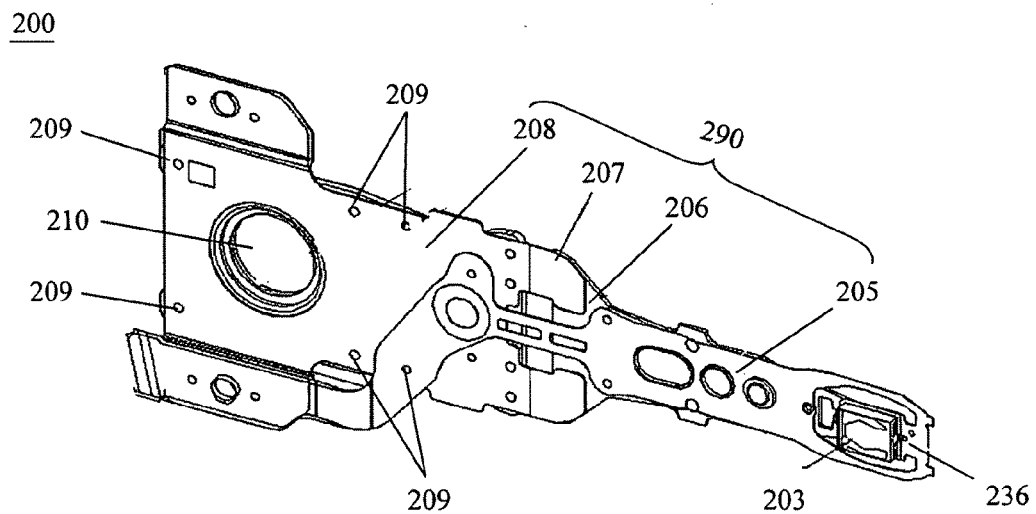
FIG. 6 is a perspective view of a HGA according to an embodiment of the present invention.

Referring to FIG. 2 and FIG. 6, the load beam 206 is used to transfer load forces to the flexure 205 and a slider 203 mounted on the flexure 205. Any suitable rigid material such as stainless steel may be used to form the load beam 206 such that the load beam 206 has sufficient stiffness to transfer the load forces to the flexure 205. The load beam 206 is connected to the base plate 208 by the hinge 207. A locating hole 213 is formed on the load beam 206 for aligning itself with the flexure 205. A dimple 211 is formed on the load beam 206 to support the flexure 205 at a position corresponding to a center of the slider 203. By this engagement of the dimple 211 with the flexure 205, the load forces can be transferred to the slider 203 uniformly.

The base plate 208 is used to enhance structure stiffness of the whole suspension 290 and may be made of rigid material such as stainless steel. A mounting hole 213 is formed on one end of the base plate 208 for mounting the whole suspension 290 to a motor arm of a disk drive unit.

The hinge 207 has a mounting hole 210 formed on its one end corresponding to the mounting hole 213 of the base plate 208, and the hinge 207 is partially mounted to the base plate 208 with the mounting holes 210, 213 aligned with each other. The hinge 207 and the base plate 208 may be mounted together by laser welding at a plurality of pinpoints 209 distributed on the hinge 207. In addition, two hinge steps 215 may be integrally formed at two sides of the hinge 207 at one end adjacent the mounting hole 210 for strengthening stiffness of the hinge 207. Two hinge struts 214 are extended from the other end of the hinge 207 to partially mount the hinge 207 to the load beam 206.

The flexure 205 is made of flexible material and runs from the hinge 207 to the load beam 206. The flexure 205 has a tail portion 238 adjacent the hinge 207 and a top portion 216 adjacent the load beam 206. A locating hole 217 is formed on the top portion 216 of the flexure 205 and is aligned with the locating hole 212 of the load beam 206. The perfect alignment between the locating holes 217 and 212 can assure a high assembly precision between the flexure 205 and the load beam 206. A gimbal tongue 236 is provided at the top portion 216 of the flexure 205 to support the slider 203 thereon.

Figure 3:
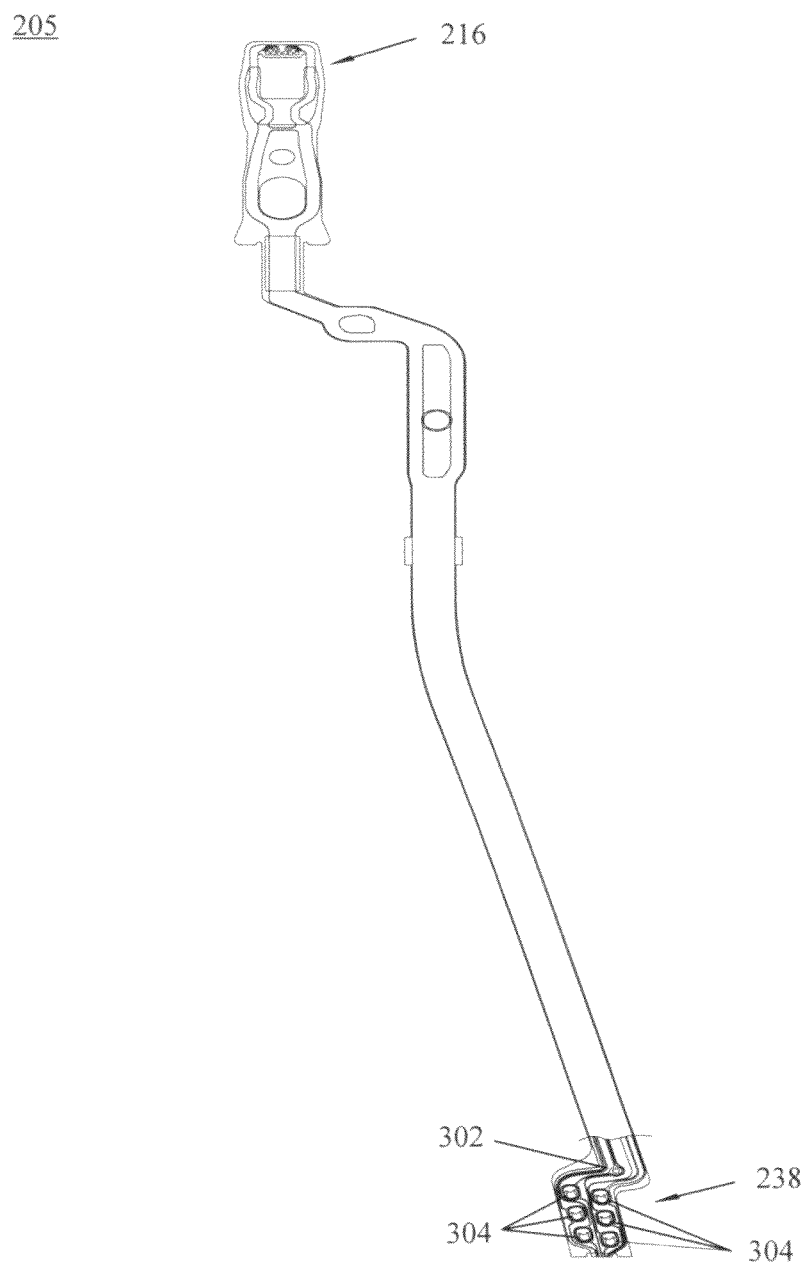
FIG. 3 is a top plan view of a flexure of the suspension shown in FIG. 2.
Figure 5:
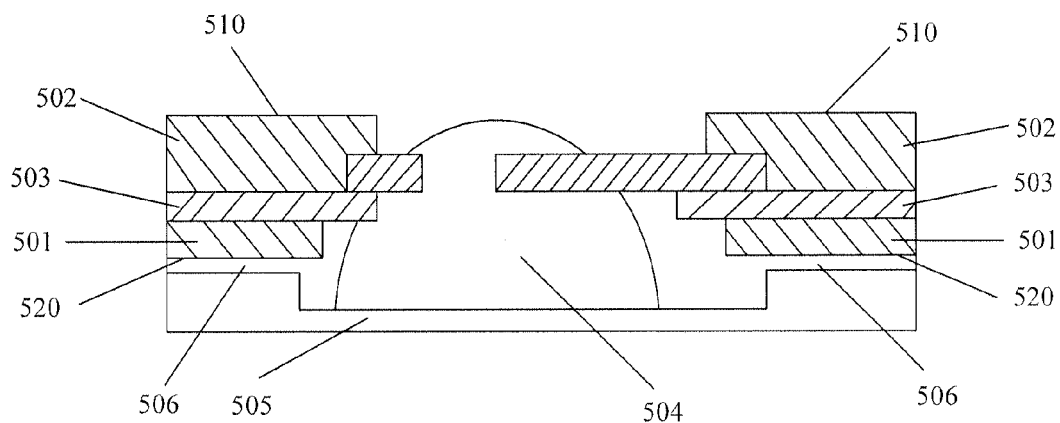
FIG. 5 is a cross-sectional side view of the flexure after solder bonding process taken along the line z-z of FIG. 4.

FIG. 3 illustrates a detail structure of the flexure 205. Referring to FIGS. 3 and 5, the flexure 205 has a top portion 216 on which the slider 203 is mounted and a tail portion 238 opposite to the top portion 216. The tail portion 238 has a plurality of bonding terminals 304 adapted for establishing electrical connection with a FPC 505, thus connecting with a control servo. The flexure 205 has some electrical traces 302 which run from the top portion 216 to the tail portion 238 formed thereon.

Figure 4:
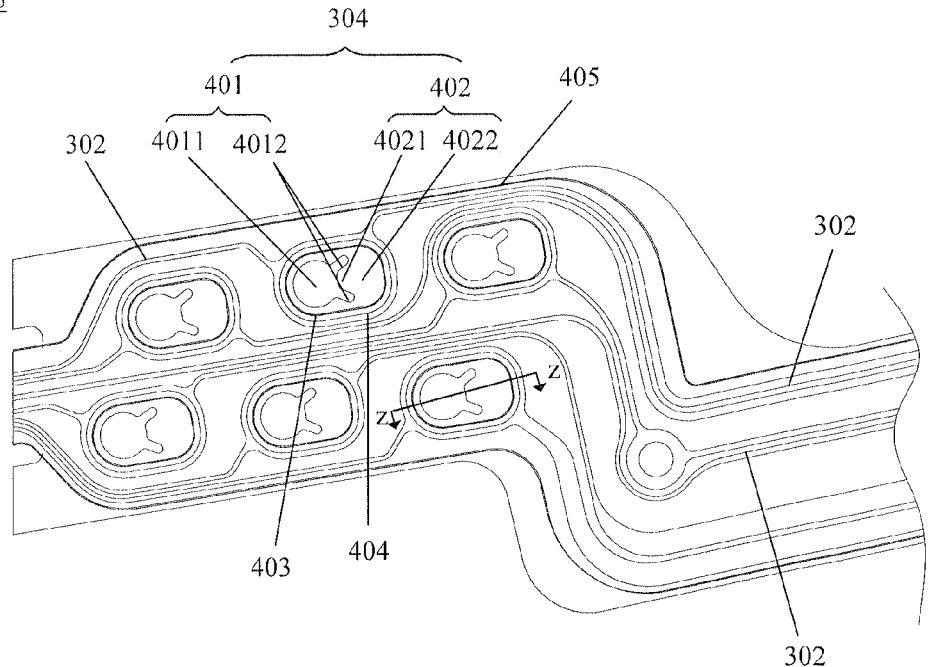
FIG. 4 is an enlarged partial plan view of the tail of the flexure shown in FIG. 3.

FIG. 4 shows the tail portion 238 of the flexure 205. Referring to FIGS. 4-5, a plurality of bonding terminals 304, such as six, formed on the tail portion 238 of the flexure 205. The bonding terminals 304 are configured for connecting with the FPC 505. Concretely, each of the bonding terminals 304 consists of a connecting pad 402 and a hole 401 formed at one end of the connecting pad 402 for electrically and mechanically connecting the connecting pad 402 to the FPC 505 by solders. The connecting pad 402 has a bonding portion 4021 adjacent to the hole 401 and an exposed portion 4022 for testing. Preferably, the hole 401 includes a center hole 4011 and two through slots 4012 connected with the center hole 4011. The through slots 4012 are symmetric about a center axis along a longitudinal direction of the flexure 205. And the bonding portion 4021 positioned between the two through slots 4012 and the exposed portion 4022 is adjacent to the bonding portion 4021. The connecting pads 402 are electrically connected with the corresponding electrical traces 302 and used to electrically connect to the slider 203 of the HGA and, in turn, the slider 203 is electrically connected with the control servo. Preferably, the connecting pads 402 are copper pads. It should be noted that the number of the bonding terminal 304 can be varied depending on the actual requirement.

FIG. 5 is a cross-sectional side view of one of the bonding terminals area after bonding with the FPC by solder, taken along the line z-z of FIG. 4. As illustrated in FIG. 5, the bonding terminal area of the flexure 205 is formed of several layers. From the first surface 510 to the second surface 520, they are a first insulate layer 502, a second insulate layer 503, and a stainless steel layer 501 respectively. The first insulate layer 502 is supported by the second insulate layer 503 and the second insulate layer 503 is supported by the stainless steel layer 501. The first insulate layer 502 has the electrical traces and the bonding terminals 304 formed therein. When the tail portion 238 is bonded with the FPC 505, the solder 504 flows through the hole 401 so as to connect the bonding portion 4021 with the FPC 505. Then the exposed portion 4022 can be used for the dynamic performance testing of the slider 203. Preferably, an air layer 506 is formed under the stainless steel layer 501 for insulating the stainless steel layer 501 and the FPC 505. Referring to FIGS. 4-5 again, in this embodiment, the first insulate window 403 corresponds to the boundary of the first insulate layer 502 and the second insulate window 405 corresponds to the boundary of the second insulate layer 503. And the stainless steel window 404 corresponds to the boundary of the stainless steel layer 501. Preferably, the first insulate layer 502 and the second insulate layer 503 are made of polyimide. Preferably, the flexure 205 further comprises cover layers (not shown) formed on the surface of the flexure 205.

Referring to FIGS. 4-5, on one aspect, during the HGA process, the exposed portion 4022 can be used for the dynamic performance testing. On the other aspect, after the dynamic performance testing, the solder 504 on the bonding pads of the FPC 505 outflows from the hole 401 when heating such that the FPC 505 and the flexure 205 are bonded by the solder 504. That is, the bonding terminals 304 are both served as bonding pads to bonding the flexure 205 to the FPC 505 through the holes 401 and testing pads for the dynamic performance testing.

Now, referring to FIG. 6, a HGA 200 according to an embodiment of the invention comprises a suspension 290 and a slider 203 carried on the suspension 290. The suspension 290 comprises a load beam 206, a base plate 208, a hinge 207 and the flexure 205, all of which are assembled with each other. The hinge 207 has a mounting hole 210 formed thereon to assemble the hinge 207 to the base plate 208. And then the slider 203 is carried on the flexure 205.

Figure 7:
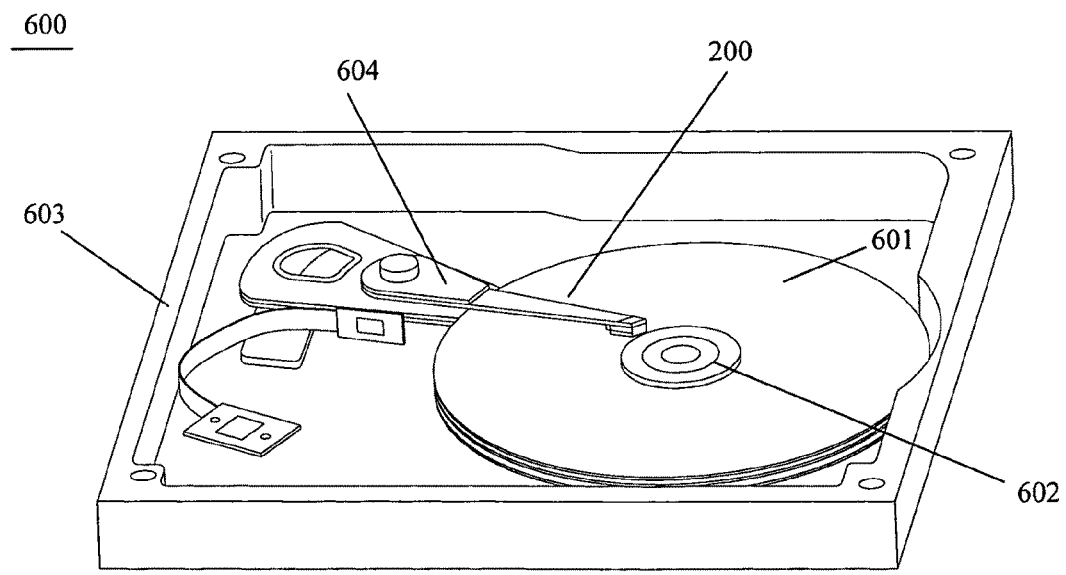
FIG. 7 is a perspective view of a disk drive unit according to an embodiment of the invention.

FIG. 7 is a disk drive unit according to an embodiment of the invention. The disk drive unit 600 comprises a HGA 200, a drive arm 604 connected to the HGA 200, a series of rotatable disks 601, and a spindle motor 602 to spin the disks 601, all of which are mounted in a housing 603. Because the structure and/or assembly process of disk drive unit of the present invention are well known to persons ordinarily skilled in the art, a detailed description of such structure and assembly is omitted herefrom.

As the connecting pad 402 has a bonding portion 4021 adjacent to the hole 401 for bonding with the FPC 505 and an exposed portion 4022 for testing, the bonding terminals 304 can be adapted both for dynamic performance testing and for bonding, the additional area with the dynamic performance testing pads formed thereon can be omitted and, in turn, the suspension length can be shortened, thus reducing the cost of suspension in the mass production.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A suspension for a head gimbal assembly, comprising:
a flexure having a tail, the tail having a plurality of electrical traces and a plurality of bonding terminals configured to connect with a flexible printed circuit formed thereon, wherein each of the bonding terminals comprises a connecting pad and a hole formed at one end of the connecting pad for electrically and mechanically connecting the connecting pad to the flexible printed circuit by bonding material, the connecting pad has a bonding portion adjacent to the hole and an exposed portion for testing.

2. The suspension according to claim 1, wherein the hole comprises a center hole and two through slots connected with the center hole, and the connecting pad has a bonding portion positioned between the two through slots and an exposed portion for testing.

3. The suspension according to claim 2, wherein the connecting pad is copper pad.

4. The suspension according to claim 1, wherein the bonding material is solder.

5. The suspension according to claim 1, wherein the flexure further comprises a stainless steel layer and two insulate layers, one of the two insulate layers forms between the stainless steel layer and the other insulate layer, the other insulate layer has electrical traces formed therein.

6. The suspension according to claim 5, wherein one or both of the insulate layer(s) is made of polyimide.

7. The suspension according to claim 1, wherein the flexure further comprises cover layers formed on a surface of the flexure.

8. A head gimbal assembly, comprising:
a slider;
a suspension with a flexure for supporting the slider, wherein the flexure comprises a tail having a plurality of electrical traces and a plurality of bonding terminals configured to connect with a flexible printed circuit formed thereon, wherein each of the bonding terminals comprises a connecting pad and a hole formed at one end of the connecting pad for electrically and mechanically connecting the connecting pad to the flexible printed circuit by bonding material, the connecting pad has a bonding portion adjacent to the hole and an exposed portion for testing.

9. The head gimbal assembly according to claim 8, wherein the hole comprises a center hole and two through slots connected with the center hole, and the connecting pad has a bonding portion positioned between the two through slots and an exposed portion for testing.

10. The head gimbal assembly according to claim 9, wherein the connecting pad is copper pad.

11. The head gimbal assembly according to claim 8, wherein the bonding material is solder.

12. The head gimbal assembly according to claim 8, wherein the flexure further comprises a stainless steel layer and two insulate layers a trace layer, one of the two insulate layers forms between the stainless steel layer and the other insulate layer, the other insulate layer has electrical traces formed therein.

13. The head gimbal assembly according to claim 12, wherein one or both of the insulate layer(s) is made of polyimide.

14. The suspension according to claim 8, wherein the flexure further comprises cover layers formed on a surface of the flexure.

15. A disk drive unit, comprising:
a head gimbal assembly including a slider and a suspension that supports the slider;
a drive arm connected to the head gimbal assembly;
a disk;
a spindle motor operable to spin the disk; and
a flexure printed circuit connected to the head gimbal assembly;
the suspension comprising:
a flexure having a tail, the tail having a plurality of electrical traces and a plurality of bonding terminals configured to connect with a flexible printed circuit formed thereon, wherein each of the bonding terminals comprises a connecting pad and a hole formed at one end of the connecting pad for electrically and mechanically connecting the connecting pad to the flexible printed circuit by bonding material, the connecting pad has a bonding portion adjacent to the hole and an exposed portion for testing.

* * * * *